Sept. 22, 1959 L. MARTIN 2,905,871
TORQUE TUBE TORQUE MOTOR
Filed Oct. 30, 1957 3 Sheets-Sheet 1

INVENTOR.
LYLE MARTIN
BY Robert C. Smith
ATTORNEY

Sept. 22, 1959     L. MARTIN     2,905,871
TORQUE TUBE TORQUE MOTOR
Filed Oct. 30, 1957     3 Sheets-Sheet 2
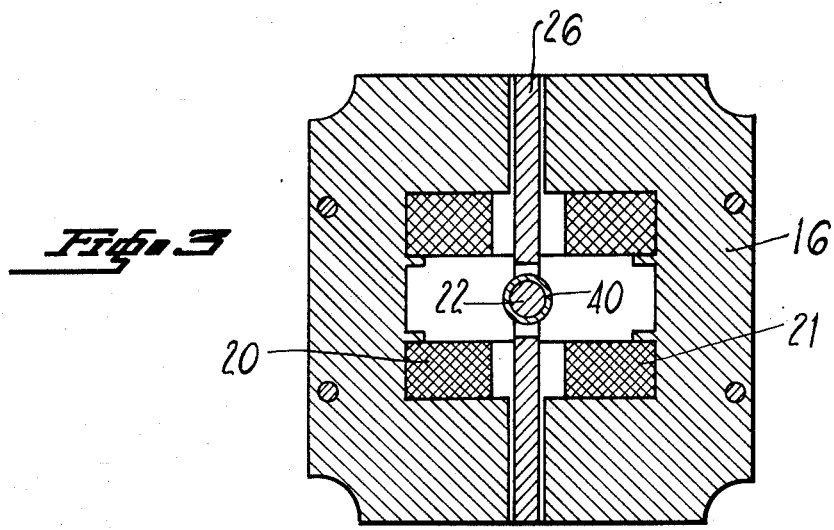
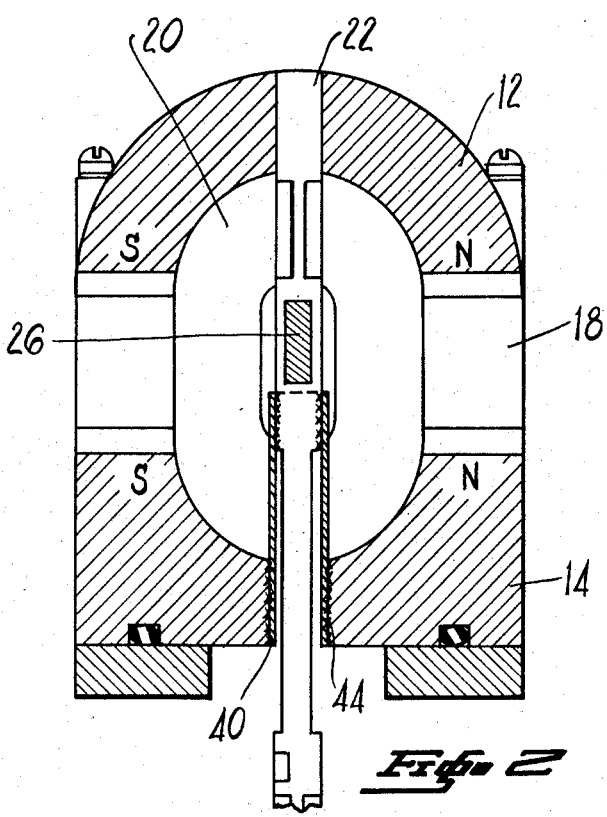
INVENTOR.
LYLE MARTIN
BY Robert C. Smith
ATTORNEY

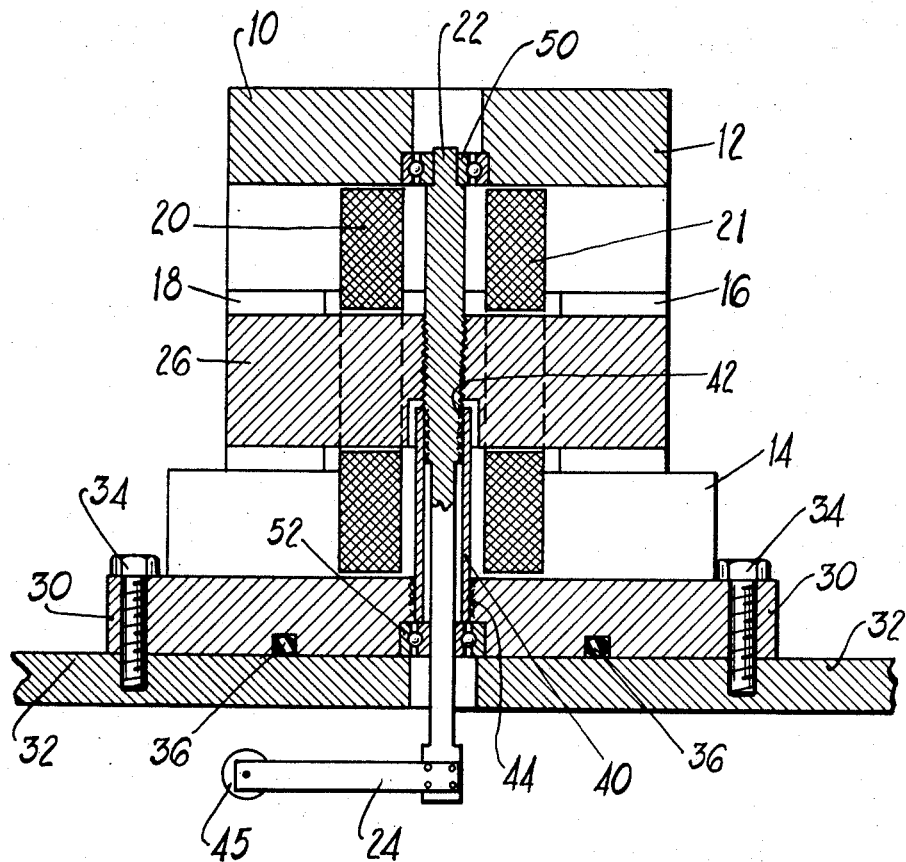

United States Patent Office 2,905,871
Patented Sept. 22, 1959

2,905,871

TORQUE TUBE TORQUE MOTOR

Lyle Martin, Marietta, Ga., assignor to Bendix Aviation Corporation, South Bend, Ind., a corporation of Delaware Application October 30, 1957, Serial No. 693,292

9 Claims. (Cl. 317—197)

This invention relates to torque motors and more particularly to a torque motor for use in servo systems having a novel sealing means between the electrical actuating structure and the output shaft.

In any type of hydraulic servo mechanism, high fluid pressures are commonly responsible for difficulties brought about by failure of seals. The torque motor structure of the present invention was designed to operate where fluid pressures up to three thousand pounds per square inch or more may be encountered. It is contemplated for use in a system wherein a servo pressure is controlled by controlling the area of an orifice. This orifice is controlled by means of a flapper valve operated by the torque motor. Where it is necessary to operate the flapper valve of a torque motor in a chamber housing high pressure fluid, it has been demonstrated that serious sealing problems may result from trying to operate the movable shaft through a conventional sealing structure.

It is therefore an object of the present invention to provide a torque motor having a novel sealing means for preventing the flow of high pressure fluid from entering the actuating mechanism thereof.

It is another object of the present invention to provide a sealing means for a torque motor wherein a torque tube is utilized, and the output force of the main shaft is exerted through said torque tube.

It is a further object of the present invention to provide a simple and effective sealing means for a torque motor wherein said sealing means is subjected to high fluid pressures.

Other objects and advantages will become apparent from the following specification taken in connection with the accompanying drawings in which:

Figure 2 is a sectional view of the device of Figure 1 taken on lines 2—2 of Figure 1.

Figure 3 is a sectional view of the device of Figures 1 and 2 taken on line 3—3 of Figure 1.

Figure 4 is a sectional view of a modified form of my invention viewed from the same position as Figure 1.

Figure 1:
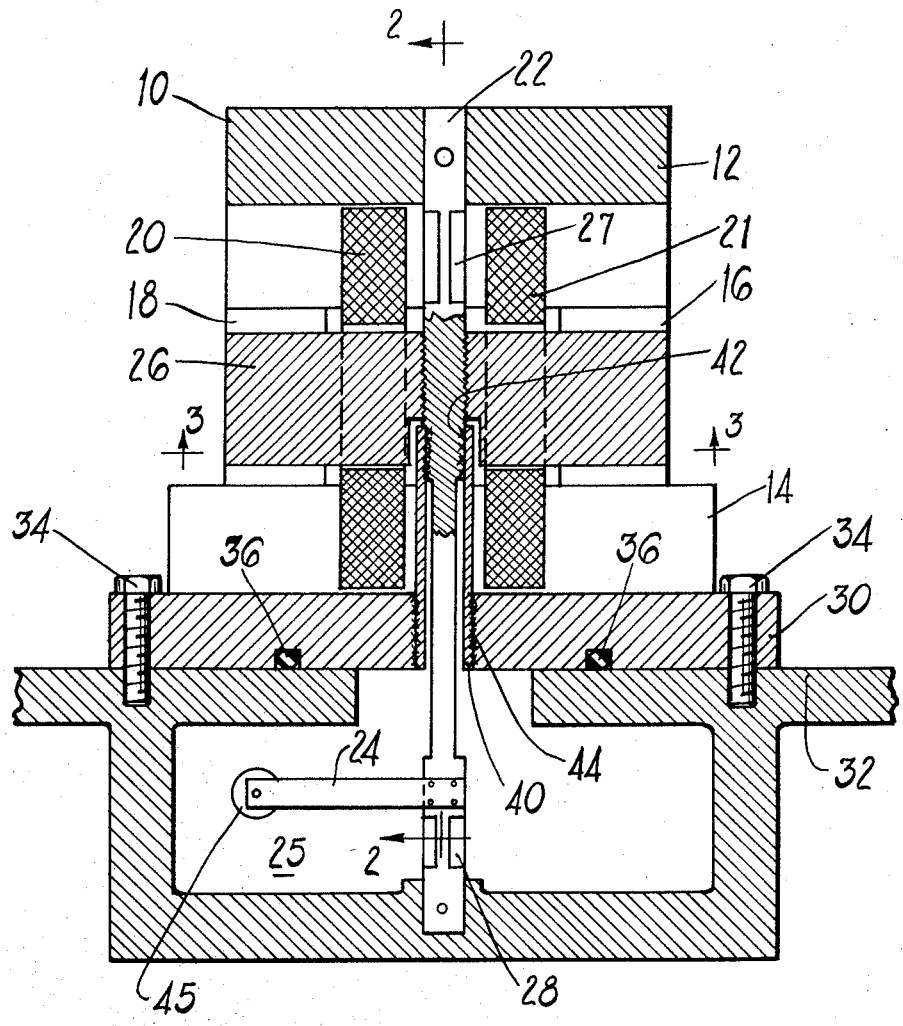
Figure 1 is a sectional view of one form of torque motor utilizing my invention.

Referring to Figure 1, my torque motor is shown generally at numeral 10. It includes a frame consisting of permanent magnet members 12 and 14 and a pair of pole pieces 16 and 18. This frame is adapted to receive a pair of windings or coils 20, 21. Supported in and pinned to the magnet member 12 is one end of a shaft 22 having attached toward its lower end a flapper member or flapper armature 24. The other end of said shaft is supported by and pinned to a wall forming part of a chamber 25 which may contain high pressure control fluid. A pair of cruciform sections 27, 28 in shaft 22 act as torsional springs to permit rotation of the center section with respect to the end supporting sections. Also attached to shaft 22 is an armature member 26, which is shown threadedly engaged with shaft 22 but which may be attached by any suitable means. Part of magnet 14 consists of a flat plate section 30 which is fastened to the wall 32 of said chamber 25 containing high pressure fuel or servo fluid by means of bolts 34. A conventional O-ring seal 36 is provided between members 30 and 32. It will be observed that shaft 22 has a section of increased diameter at its upper end and a section of reduced diameter toward its lower end. A hollow thin walled cylindrical member 40 is brazed or otherwise attached to this increased diameter section at numeral 42 in such way that a liquid-tight seal is produced. The opposite end of said cylindrical member or tube is similarly attached at numeral 44 to the stationary frame member 30. A valve member 45 may be attached to the end of flapper 24 for controlling the fluid pressure in chamber 25.

Figure 2 shows a view of my torque motor taken on line 2—2 of Figure 1 which is in section except for shaft 22, shown in full. In this view it will appear that permanent magnet members 12 and 14 are horseshoe shaped in cross-section. The pole piece 18 is positioned between members 12 and 14 and the assembly is held together by a plurality of bolts located at the outside corners. Coil 20 is shown in full and it will be observed that the armature 26 is positioned through the center of said coil.

Figure 3 shows a sectional view of my torque motor taken on line 3—3 of Figure 1. This is a section through the pole pieces 16 and 18 and the coils 20, 21. The torque tube sealing member 40 is shown positioned concentric with respect to shaft 22.

Figure 4 shows a modified form of my torque motor viewed from the same position as Figure 1. Similar parts have been given similar numbers. This form differs from that of Figure 1 only in that shaft 22 is supported in members 12 and 14 by means of a pair of bearings 50, 52 rather than being pinned to members 12 and 25 as in Figure 1.

Operation is essentially the same in either version. It is the function of the torque motor to open and close a port, not shown, by means of the valve member 45, to thereby control the fluid pressure level in chamber 25. When windings 20 or 21 are energized they cause the armature member 26 to be moved in one direction or the other depending on the polarity of the signal applied to said windings. As the armature 26 moves it carries with it the shaft 22 and the flapper member 24 and, hence, valve member 45. Inasmuch as the torque tube member 40 is attached at one end to said shaft member, it must also move in response to movement of the armature, but the opposite end, that end attached to the member 30, must remain stationary. The tube 40 is therefore subjected to a torsional or twisting force when the torque motor is energized. The normal travel of the torque motor is extremely small, usually of the order of 0.01 radian, and the amount of actual deflection required of the torque tube member 40 is, therefore, not substantial. This characteristic also makes it possible as in Figure 1 to pin the shaft 22 at each end and rely upon the cruciform sections 27, 28 to act as torsional springs permitting the center part of shaft 22 to rotate as desired while holding the ends in position. For some applications, this arrangement is preferable to that of Figure 4, in which bearings are used, because, although more electrical energy is required, the system is freed of hysteresis effects and maintenance problems introduced by the bearings.

The torque tube sealing means makes it possible to operate the torque motor adjacent a chamber containing fluid at very high pressure without danger of damage to the windings from leakage of the control fluid. It will be recognized that this sealing means is very positive and capable of withstanding much greater pressure differentials than those usually used.

In the Figure 4 embodiment, the shaft 22 is supported by bearings 50, 52. Even though the control fluid from chamber 25 leaks through the bearing 52, it can flow only as far as the weld or seal 42 between the torque tube 40 and the shaft 22. This construction requires considerably less electrical energy to actuate the armature than does the construction of Figure 1.

While only two embodiments have been shown and described herein, it will be recognized that modifications may be made to suit the requirements of a particular application without departing from the scope of the present invention.

I claim:

1. A torque motor having a frame of ferrous material, an armature movable with respect to said frame, a winding inductively related to said armature and means for energizing said winding, a shaft supported in said frame and having each end thereof secured in such manner as to prevent rotation in said frame, a center section of said shaft having said armature attached thereto, a cruciform section in said shaft between said center section and each end thereof, a flapper member attached to said center section and exposed to liquid under pressure, and a liquid seal comprising a torque tube having one end sealed to said center section and the other end sealed to said frame, whereby, upon energizing of said winding, said armature will be caused to move thereby exerting a force on said center section twisting said torque tube and moving said flapper member.

2. A torque motor having a frame of ferrous material, an armature movable with respect to said frame, a winding inductively related to said armature and means for energizing said winding, a shaft supported in said frame and having each end thereof secured in such manner as to prevent rotation in said frame, a center section of said shaft having said armature attached thereto, a section in said shaft between said center section and each end having a reduced resistance to torsional forces, a flapper member attached to said center section, and a liquid seal comprising a torque tube having one end sealed to said center section and the other end sealed to said frame, whereby, upon energizing said winding said armature will be caused to move thereby exerting a force on said center section twisting said torque tube and moving said flapper member.

3. A torque motor having a frame of ferrous material, an armature movable with respect to said frame, a winding inductively related to said armature and means for energizing said winding, a shaft supported in said frame and attached to said armature, and a flapper member attached to said shaft and exposed to liquid under pressure, liquid sealing means between said shaft and said frame comprising a torque tube having one end attached to said frame to form a liquid-tight seal and the other end attached to said shaft to form a liquid-tight seal.

4. In a torque motor having a frame, an armature movable with respect to said frame, a winding inductively related to said armature, a shaft supported in said frame and having each end thereof secured in such manner as to prevent rotation in said frame, a center section of said shaft having said armature attached thereto, a section in said shaft between said center section and each end having a reduced resistance to torsional forces, a flapper member attached to said center section, and liquid sealing means positioned between said shaft and said frame comprising a torque tube having one end attached to form a liquid-tight seal on said frame and the other end attached to form a liquid-tight seal on said shaft.

5. In a torque motor having a frame, an armature movable with respect to said frame, a winding inductively related to said armature, a shaft attached to said armature and a flapper member attached to said shaft, bearing means supporting said shaft in said frame, and liquid sealing means positioned between said shaft and said frame comprising a torque tube having one end attached to form a liquid-tight seal on said frame and the other end attached to form a liquid-tight seal on said shaft.

6. In a torque motor having a frame of ferrous material, an armature movable with respect to said frame, a winding inductively related to said armature, a shaft attached to said armature and a flapper member attached to said shaft: liquid sealing means positioned between said shaft and said frame comprising a torque tube having one end attached to form a liquid-tight seal on said frame and the other end attached to form a liquid-tight seal on said shaft.

7. For use with a torque motor having a frame, an output shaft, a flapper member carried on said shaft, and electrically actuated means for controlling movement of said shaft: liquid sealing means positioned between said shaft and said frame comprising a torque tube having one end attached to form a liquid-tight seal on said frame and the other end attached to form a liquid-tight seal on said shaft.

8. A torque motor having a frame of ferrous material, an armature movable with respect to said frame, a winding inductively related to said armature and means for energizing said winding, a shaft supported in said frame and attached to said armature, and a flapper member attached to said frame and exposed to liquid under pressure, liquid sealing means between said shaft and said frame comprising a thin-walled metal sealing member having a first portion attached to said frame to form a liquid-tight seal and a second portion attached to said shaft to form a liquid-tight seal, said member being deformable between said first and second portions.

9. In a torque motor having a frame of ferrous material, an armature movable with respect to said frame, a winding inductively related to said armature, a shaft attached to said armature and a flapper member attached to said shaft: a liquid sealing means positioned between said shaft and said frame comprising a metallic sealing member having a first portion attached to said frame to form a liquid-tight seal and a second portion attached to said shaft to form a liquid-tight seal, said member being deformable between said first and second portions.

References Cited in the file of this patent
UNITED STATES PATENTS

| | | |
|---|---|---|
| 2,574,082 | Andersen | Nov. 6, 1951 |
| 2,658,805 | Mendelsohn | Nov. 10, 1953 |
| 2,718,614 | Gamble | Sept. 20, 1955 |